US008462769B2

(12) United States Patent
Justusson et al.

(10) Patent No.: US 8,462,769 B2
(45) Date of Patent: Jun. 11, 2013

(54) SYSTEM AND METHOD FOR MANAGING CREATED LOCATION CONTEXTS IN A LOCATION SERVER

(75) Inventors: Gary Neil Justusson, Figtree (AU); Anthony James Winterbottom, Gwynneville (AU)

(73) Assignee: Andrew LLC, Hickory, NC (US)

( * ) Notice: Subject to any disclaimer, the term of this patent is extended or adjusted under 35 U.S.C. 154(b) by 1112 days.

(21) Appl. No.: 12/411,883

(22) Filed: Mar. 26, 2009

(65) Prior Publication Data
US 2010/0246567 A1    Sep. 30, 2010

(51) Int. Cl.
*H04L 12/66* (2006.01)

(52) U.S. Cl.
USPC ........................................ 370/352; 455/404.2

(58) Field of Classification Search
USPC ............... 370/352–356; 455/404.1–404.2, 455/414.1–414.4, 575.1–575.9, 422, 456.1–457
See application file for complete search history.

(56) References Cited

U.S. PATENT DOCUMENTS

| | | | |
|---|---|---|---|
| 4,728,959 A | 3/1988 | Maloney | |
| 5,327,144 A | 7/1994 | Stilp et al. | |
| 5,608,410 A | 3/1997 | Stilp et al. | |
| 5,959,580 A | 9/1999 | Maloney et al. | |
| 6,047,192 A | 4/2000 | Maloney | |
| 6,091,362 A | 7/2000 | Stilp | |
| 6,097,336 A | 8/2000 | Stilp | |
| 6,097,709 A | 8/2000 | Kuwabara | |
| 6,101,178 A | 8/2000 | Beal | |
| 6,108,555 A | 8/2000 | Maloney et al. | |
| 6,108,558 A | 8/2000 | Vanderspool, II | |
| 6,115,599 A | 9/2000 | Stilp | |
| 6,115,605 A | 9/2000 | Siccardo et al. | |
| 6,115,754 A * | 9/2000 | Landgren .................... 709/249 |
| 6,119,013 A | 9/2000 | Maloney et al. | |
| 6,127,975 A | 10/2000 | Maloney | |
| 6,172,644 B1 | 1/2001 | Stilp | |
| 6,184,829 B1 | 2/2001 | Stilp | |
| 6,266,013 B1 | 7/2001 | Stilp et al. | |
| 6,269,246 B1 | 7/2001 | Rao et al. | |
| 6,281,834 B1 | 8/2001 | Stilp | |
| 6,285,321 B1 | 9/2001 | Stilp et al. | |
| 6,288,675 B1 | 9/2001 | Maloney | |

(Continued)

FOREIGN PATENT DOCUMENTS

| | | |
|---|---|---|
| WO | 2006088472 A1 | 8/2006 |
| WO | 2009142963 A2 | 11/2009 |

OTHER PUBLICATIONS

J Winterbottom; "Held Protocol Context Management Extensions"; Internet Engineering Task Force; Standard Working Draft, Internet Society; Geneva Switzerland; No. 3; Sep. 29, 2008; pp. 2-24.

(Continued)

*Primary Examiner* — Kevin Mew
(74) *Attorney, Agent, or Firm* — Duane Morris LLP (57) ABSTRACT

A system and method for creating a location uniform resource identifier ("URI") for determining the location of a target device. A location request may be received for a target device. Location context information may be collected for the target device including starting information, validating information and policy information. This collected location context information may be encrypted in a location information server and converted to a form compatible with URI syntax. A location URI may then be constructed as a function of the converted information.

23 Claims, 6 Drawing Sheets

U.S. PATENT DOCUMENTS

| | | | |
|---|---|---|---|
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,393,294 B1 | 5/2002 | Perez-Breva et al. | |
| 6,400,320 B1 | 6/2002 | Stilp et al. | |
| 6,449,486 B1 | 9/2002 | Rao | |
| 6,463,290 B1 | 10/2002 | Stilp et al. | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,546,256 B1 | 4/2003 | Maloney et al. | |
| 6,563,460 B2 | 5/2003 | Stilp et al. | |
| 6,591,112 B1 | 7/2003 | Siccardo et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,782,264 B2 | 8/2004 | Anderson | |
| 6,782,265 B2 | 8/2004 | Perez-Breva et al. | |
| 6,873,290 B2 | 3/2005 | Anderson et al. | |
| 6,876,859 B2 | 4/2005 | Anderson et al. | |
| 6,944,465 B2 | 9/2005 | Spain et al. | |
| 6,996,392 B2 | 2/2006 | Anderson | |
| 7,023,383 B2 | 4/2006 | Stilp et al. | |
| 7,116,987 B2 | 10/2006 | Spain, Jr. et al. | |
| 7,167,713 B2 | 1/2007 | Anderson | |
| 7,167,714 B2 | 1/2007 | Dressler et al. | |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,271,765 B2 | 9/2007 | Stilp et al. | |
| 7,340,259 B2 | 3/2008 | Maloney | |
| 7,383,051 B2 | 6/2008 | Spain, Jr. et al. | |
| 7,400,876 B2 * | 7/2008 | Freilich | 455/404.1 |
| 7,427,952 B2 | 9/2008 | Bull et al. | |
| 7,433,652 B2 | 10/2008 | Durgin | |
| 7,433,695 B2 | 10/2008 | Gordon et al. | |
| 7,440,762 B2 | 10/2008 | Maloney et al. | |
| 7,441,032 B2 * | 10/2008 | Costa Requena | 709/225 |
| 7,460,505 B2 | 12/2008 | Spain | |
| 7,475,140 B2 * | 1/2009 | Requena | 709/225 |
| 7,593,738 B2 | 9/2009 | Anderson | |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,796,966 B2 | 9/2010 | Bhattacharya et al. | |
| 7,848,762 B2 | 12/2010 | Gordon et al. | |
| 7,870,196 B2 * | 1/2011 | Costa Requena | 709/206 |
| 7,899,467 B2 | 3/2011 | Feuerstein et al. | |
| 8,013,785 B2 | 9/2011 | Bhattacharya et al. | |
| 8,068,802 B2 | 11/2011 | Bhattacharya et al. | |
| 8,068,855 B2 | 11/2011 | Dressler et al. | |
| 8,106,817 B2 | 1/2012 | Bhattacharya et al. | |
| 8,106,818 B2 | 1/2012 | Bhattacharya et al. | |
| 8,149,697 B2 * | 4/2012 | Parkkinen et al. | 370/230 |
| 8,155,394 B2 | 4/2012 | Allegra et al. | |
| 8,205,074 B2 * | 6/2012 | Hoshino et al. | 713/156 |
| 2002/0004399 A1 * | 1/2002 | McDonnell et al. | 455/456 |
| 2002/0172223 A1 | 11/2002 | Stilp et al. | |
| 2003/0064734 A1 | 4/2003 | Stilp et al. | |
| 2004/0203539 A1 | 10/2004 | Benes et al. | |
| 2005/0135335 A1 * | 6/2005 | Hession et al. | 370/352 |
| 2006/0003775 A1 | 1/2006 | Bull et al. | |
| 2006/0030333 A1 | 2/2006 | Ward et al. | |
| 2006/0165060 A1 * | 7/2006 | Dua | 370/352 |
| 2007/0111746 A1 | 5/2007 | Anderson et al. | |
| 2007/0127448 A1 * | 6/2007 | Buntin et al. | 370/356 |
| 2007/0136603 A1 * | 6/2007 | Kuecuekyan | 713/185 |
| 2007/0155401 A1 | 7/2007 | Ward et al. | |
| 2007/0155489 A1 | 7/2007 | Beckley et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0228654 A1 * | 9/2008 | Edge | 705/71 |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2010/0248740 A1 * | 9/2010 | Justusson et al. | 455/456.1 |
| 2012/0149325 A1 * | 6/2012 | Titus et al. | 455/404.2 |

OTHER PUBLICATIONS

M Barnes et al.; "HTTP Enabled Location Delivery (HELD)"; Internet Engineering Task Force; Standard Working Draft; Geneva Switzerland; vol. geopriv, No. 13; Feb. 25, 2009; entire document.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR MANAGING CREATED LOCATION CONTEXTS IN A LOCATION SERVER

RELATED APPLICATIONS

The instant application is related to and co-pending with U.S. application Ser. No. 12/411,928, entitled, "System and Method for Managing Created Location Contexts in a Location Server," filed Mar. 26, 2009, the entirety of which is incorporated herein by reference.

BACKGROUND

The location of a mobile, wireless or wired device is a useful and sometimes necessary part of many services. A Location Information Server ("LIS") may be responsible for providing location information to such devices with an access network. The LIS may utilize knowledge of the access network and its physical topology to generate and serve location information to devices.

The LIS, in general terms, is a network node originally defined in the National Emergency Number Association ("NENA") i2 network architecture addressing a solution for providing E-911 service for users of Voice over Internet Protocol ("VoIP") telephony. In VoIP networks, the LIS is the node that determines the location of the VoIP terminal. Beyond the NENA architecture and VoIP, the LIS is a service provided by an access network provider to supply location information to users of the network by utilizing knowledge of network topology and employing a range of location determination techniques to locate devices attached to the network. The precise methods used to determine location are generally dependent on the type of access network and the information that can be obtained from the device. For example, in a wired network, such as Ethernet or DSL, a wiremap method is commonplace. In wiremap location determination, the location of a device may be determined by finding which cables are used to send packets to the device. This involves tracing data through aggregation points in the network (e.g., Ethernet switches, DSL access nodes) and finding the port for which packets are sent to the device. This information is combined with data available to the LIS (generally extracted from a database) to determine a final location of the device.

In wireless networks, a range of technologies may be applied for location determination, the most basic of which uses the location of the radio transmitter as an approximation. The Internet Engineering Task Force ("IETF") and other standards forums have defined various architectures and protocols for acquiring location information from an LIS. In such networks, an LIS may be automatically discovered and location information retrieved using network specific protocols. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may generally be passed to another party which can utilize it to retrieve the target device's location at a later time, typically from the same location server that provided the location URI. There is, however, a need in the art to overcome the limitations of the prior art and provide a novel system and method for managing created location contexts in a location server.

One embodiment of the present subject matter provides a method for creating a location URI for determining the location of a target device. The method may comprise receiving a location request for a target device and collecting location context information for the target device including starting information, validating information and policy information. The collected location context information may be encrypted in an LIS and then converted to a form compatible with URI syntax. A location URI may then be constructed as a function of the converted information.

Another embodiment of the present subject matter may provide a method for handling a location request for a target device using a location URI. The method may comprise receiving a location request for a target device from a requesting entity, the target device having a location context information represented by a location URI and including starting information, initial validating information and policy information. The form of the location URI may be verified by an LIS, the form including at least an encrypted context string. The encrypted context string may be extracted and decrypted by the LIS and it may be determined if the location request can continue as a function of the policy information. An estimated location of the target device may then be determined as a function of the starting information and additional validating information collected. This additional validating information may be correlated with the initial validating information, and the estimated location of the target device provided to the requesting entity.

A further embodiment of the present subject matter provides an LIS comprising circuitry for receiving a location request for a target device, circuitry for collecting location context information for the target device including starting information, validating information and policy information. The LIS may also include circuitry for encrypting the collected location context information, and circuitry for converting the encrypted location context information to a form compatible with URI syntax. The LIS may include circuitry for constructing a location URI as a function of the converted information.

One embodiment of the present subject matter provides an LIS comprising circuitry for receiving a location request for a target device, the target device having a location context information represented by a location URI and including starting information, initial validating information and policy information. The LIS may include circuitry for verifying the form of the location URI, the form including at least an encrypted context string, circuitry for extracting and decrypting the encrypted context string, and circuitry for determining if the location request can continue as a function of the policy information. Further, the LIS may include circuitry for determining an estimated location of the target device as a function of the starting information, circuitry for collecting additional validating information, and circuitry for correlating the additional validating information with the initial validating information. The LIS may also include circuitry for providing the estimated location of the target device to the requesting entity.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for managing created location contexts in a location server are herein described.

As generally discussed above, the Location Information Server ("LIS") is a network server that provides devices with information about their location. The phrases and respective acronyms of Location Information Server ("LIS") and Location Server ("LS") are used interchangeably throughout this document and such should not limit the scope of the claims appended herewith. Devices that require location information are able to request their location from the LIS. In the architectures developed by the IETF, NENA and other standards forums, the LIS may be made available in an exemplary IP access network connecting one or more target devices to the Internet. In other modes of operation, the LIS may also provide location information to other requesters relating to a target device. To determine location information for a target device, an exemplary LIS may utilize a range of methods. The LIS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

A location server according to an embodiment of the present subject matter may utilize a range of inputs to determine location information for the target device. For example, from a request made of the location server, the location server may determine one or more parameters, e.g., Internet Protocol ("IP") and Media Access Control ("MAC") addresses, that uniquely identify the target mobile device. This identification information may be used as an input to an exemplary measurement collection process that produces further information in the form of measurements or measurement results. Measurement information may also be data already known to the location server, additional parameters that identify the target mobile device in other ways, and/or parameters relating to the network attachment of the target mobile device. Non-limiting examples include the MAC address of the device, the identity of network nodes from which network traffic to and from the device transits (including any physical connections involved), the location of network intermediaries (e.g., wiring maps), radio timing, signal strength measurements and other terrestrial radio frequency information, and network configuration parameters, to name a few.

Protocols such as Flexible LIS-ALE Protocol ("FLAP") are being developed in the Alliance for Telecommunications Industry Solutions ("ATIS") forum to provide a formal definition of location-related measurements for different types of access networks. FLAP generally facilitates transfer of values of location measurement parameters from a network to the LIS to enable the latter to compute the location of an IP end-device. The LIS may interact with an Access Location Entity ("ALE") residing in an access network to retrieve location measurements. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may be passed to another party which can utilize it to retrieve the target device's location at a later time, typically from the same location server that provided the location URI.

Figure 1A:
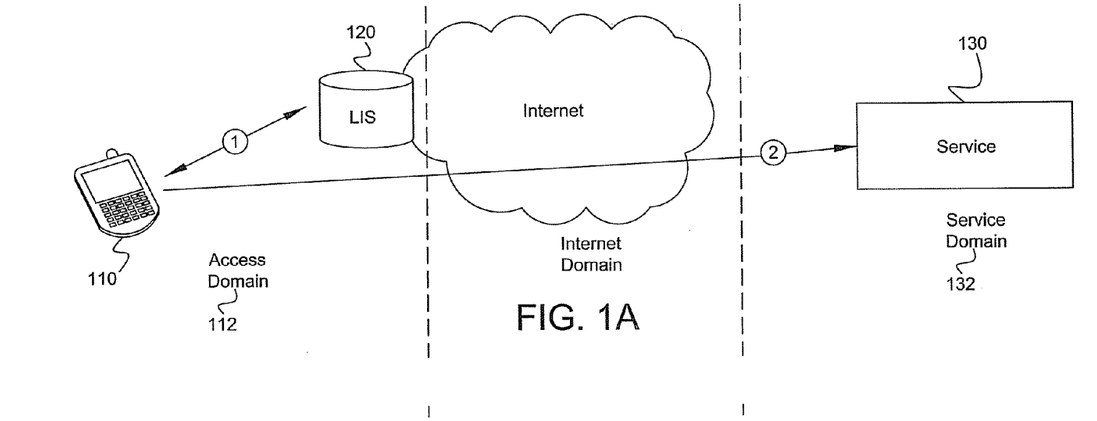
FIGS. 1A-1C are diagrams of Internet location services models.
Figure 1B:
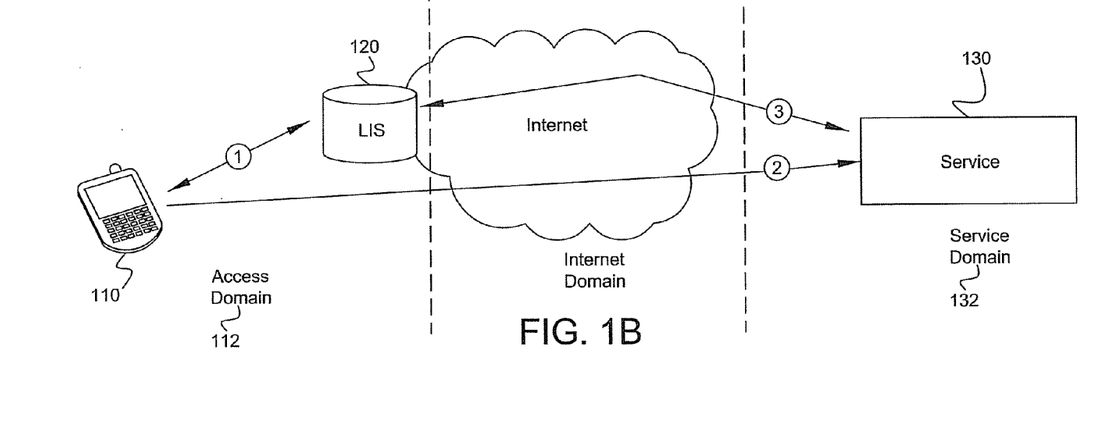
Figure 1C:
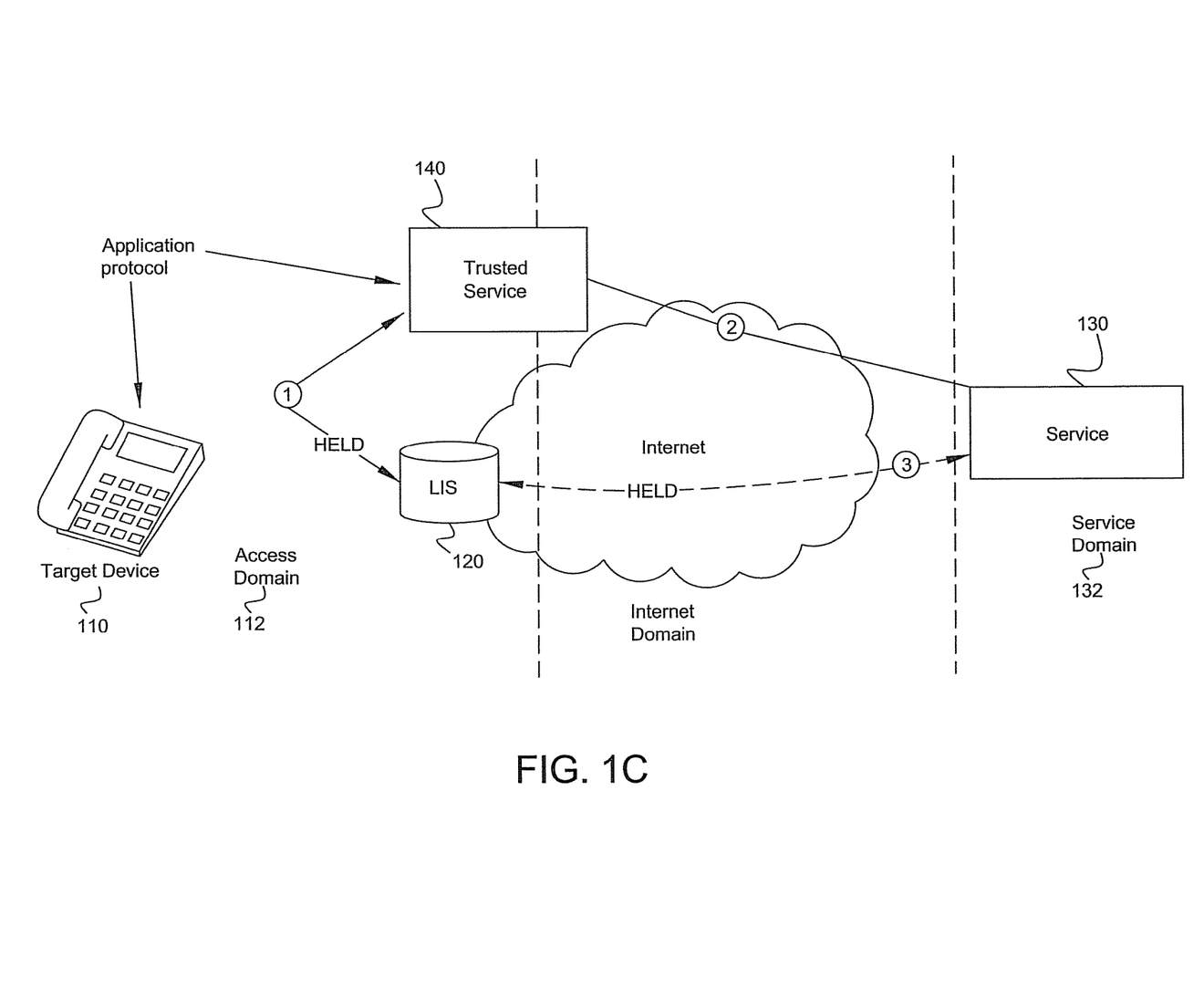

There are many models in which an LIS may be utilized. For example, FIGS. 1A-1C provide three examples of Internet location services models for an LIS. With reference to FIG. 1A, a location by value model is provided in which a target device 110 may obtain a location from a location server 120 in a respective access network or domain 112 in step 1. The device 110 may then convey its location to a location based service 130 in the service domain 132 using an appropriate application protocol in step 2. With reference to FIG. 1B, a location by reference model is provided in which a mobile device 110 may obtain a reference from the location server 120 in the respective access network or domain 112 in step 1. The device 110 may convey the reference to the location based service 130 in the service domain using an appropriate application protocol in step 2. The service 130 may then query the location server 120 direct for location values for the device 110 in step 3. Generally the protocol utilized for communication between the device 110 and location server 120 is HTTP Enabled Location Delivery ("HELD") and the protocol utilized for communication between the location server 120 and the service 130 is HELD. The protocol utilized for communication between the device 110 and the service 130 is application protocol dependent.

With reference to FIG. 1C, an on-behalf-of ("OBO") location model is provided in which a trusted third party application or service 140 queries for the location of a device 110. A client identity, which is understood by the location server 120, may be used as a query parameter (e.g., IP or MAC address) in step 1. If applicable, the third party 140 may provide location information to external service entities 130 in step 2. If the location was requested and provided by reference, the external entity 130 may query back to the location server 120 for location value updates using the HELD protocol in step 3. The above described Internet location services models illustrate how LIS clients may request and receive location information from the LIS. The value of parameters derived from such a communications network may be used by the device and may be used by the LIS to determine location. In order to make use of these parameters, it is necessary for their values to be transferred form the communication network elements to the LIS, which is one purpose of FLAP.

Figure 2:
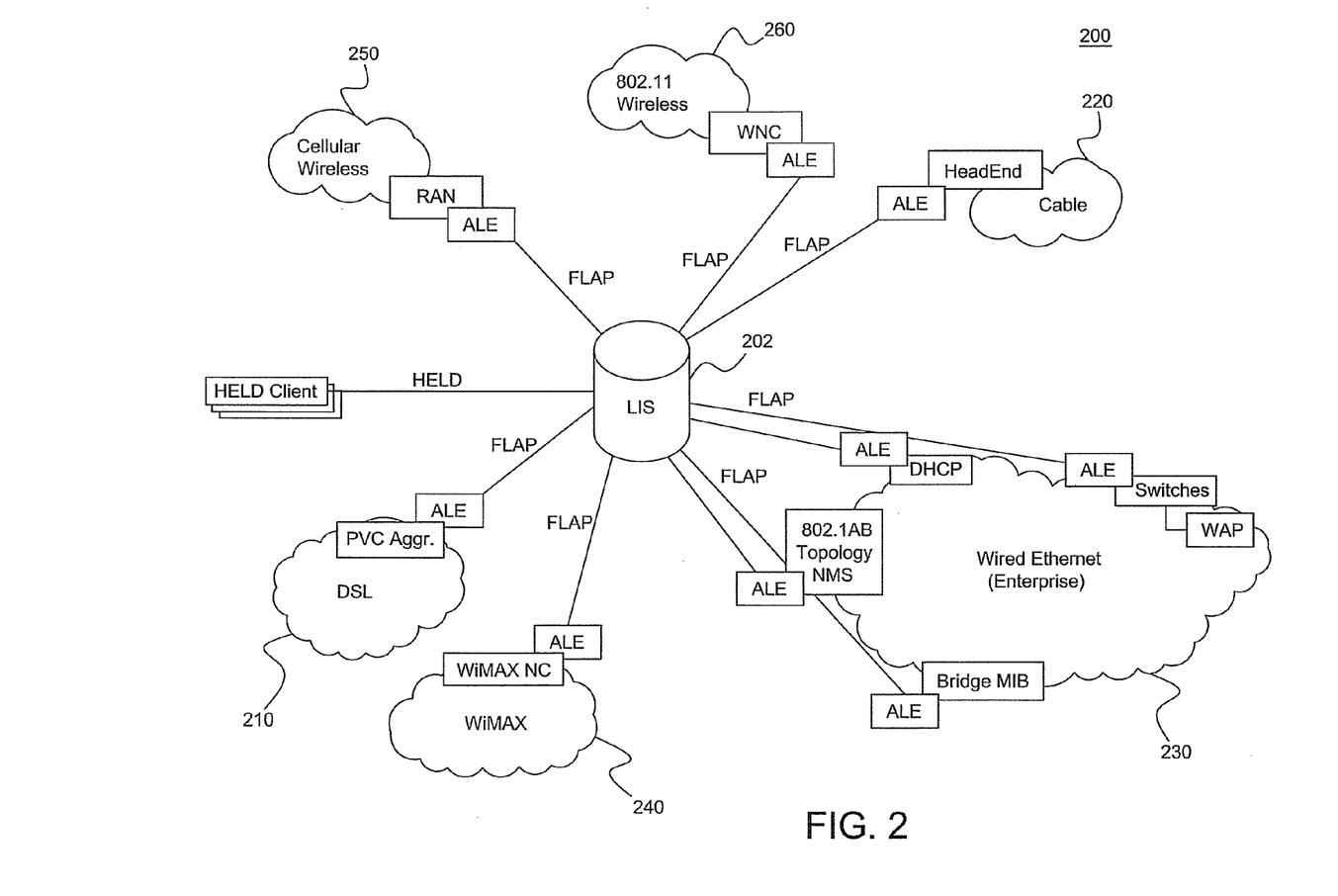
FIG. 2 is a diagram of an exemplary access network model.

FIG. 2 is a diagram of an exemplary access network model. With reference to FIG. 2, an exemplary access network model 200 may include one or more LISs 202 connected to one or more access networks, 210-260. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 210, cable 220, WiFi, wired Ethernet 230, WiMAX 240, cellular packet services 250, and 802.11 wireless 260, among others.

Figure 3:
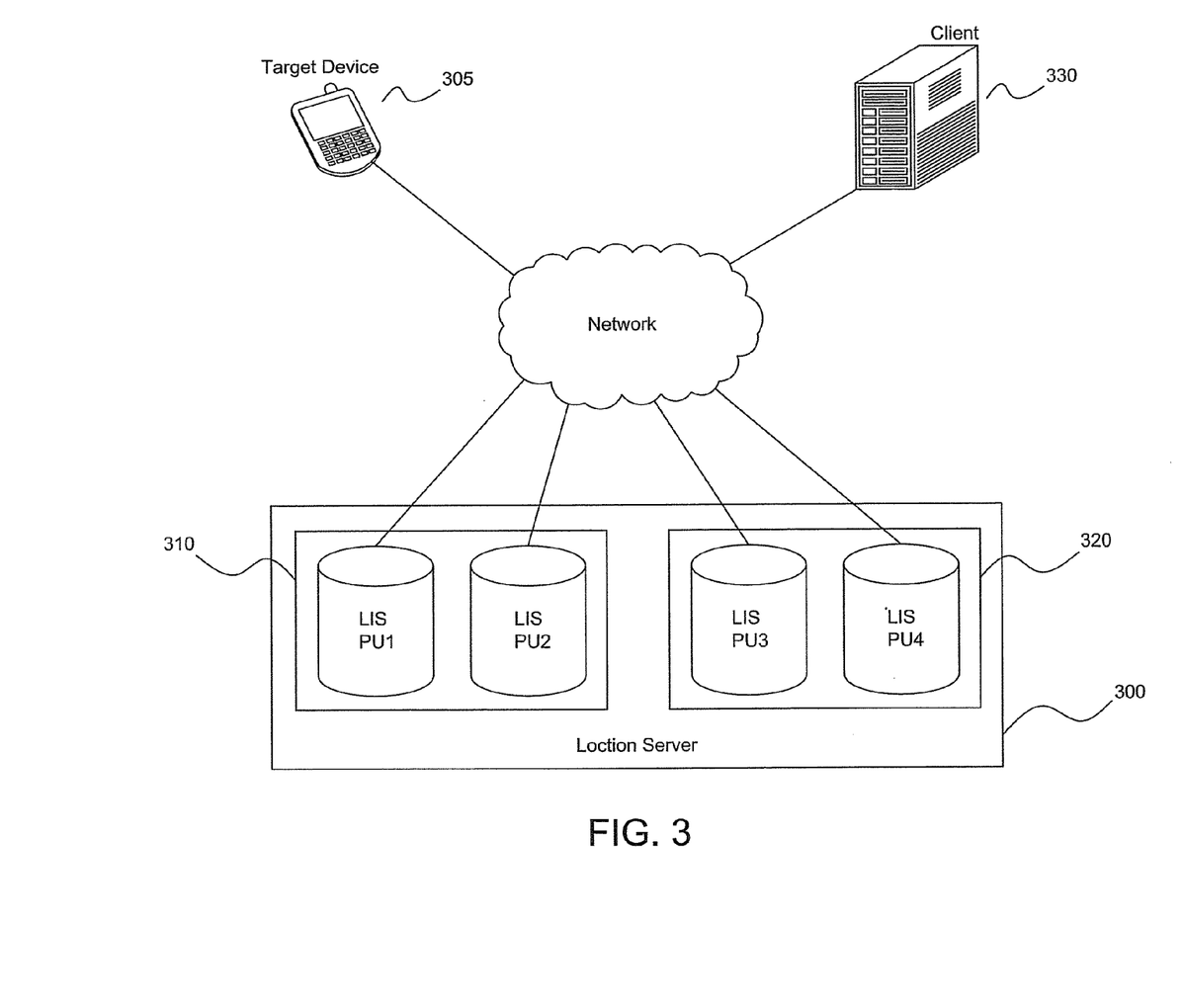
FIG. 3 is a diagram of a location server according to one embodiment of the present subject matter.

FIG. 3 is a diagram of a location server according to one embodiment of the present subject matter. With reference to FIG. 3, in some application domains, such as emergency services, location servers should be available at all times. To ensure this, an exemplary location server 300 may be implemented on multiple processing units, PU1, PU2, PU3, PU4, any one of which may provide location information for a target device 305 from a first site 310, a second site 320 and/or additional sites (not shown). In one embodiment, an exemplary location server 300 may provide high availability by having more than one PU at a first site 310 and by having multiple PUs at the second site 320 for copying or backup purposes in the event a site or PU fails. In a location URI context, one embodiment of the present subject matter may include a client system 330 that utilizes a location URI passed by the target device 305 to acquire the location of the target device 305. Of course, these examples are only a few of the many possible configurations of redundant PUs that could be employed utilizing embodiments of the present subject matter and such examples are not intended to limit the scope of the claims appended herewith.

For a location URI to be utilized in providing a target device's location, a location context for the device should be established. In one embodiment, this location context may comprise starting details, validating details, and policy details. Starting details may be any information required to initiate a location determination for the target device, e.g., IP address, MAC address, etc. Validating details may be any information used to ensure the starting details still apply to the same target device. Validating details are generally needed because some of the starting details may become invalid, and over time, may refer to a different device. Some level of confidence may generally be required to ensure that the starting details continue to refer to the same target device. Exemplary validating details in an enterprise network may be, but are not limited to, the MAC address of the target device, assuming this information is available to the location server. Policy details may be any information indicating whether a location is allowed to be provided, including but not limited to, a location context expiry time (e.g., after this time, the location context cannot be used), etc.

Conventionally, location context information is shared among the processing units within a location server using a back channel, such as a shared database, or using inter-processing unit network communication. However, such prior art mechanisms may be too complex to implement, may be fragile, and/or may have difficulty to manage failure modes such as race conditions. Furthermore, these deficiencies are magnified in geographically redundant configurations. Embodiments of the present subject matter, however, embed and utilize location context information directly in the location URI, thus avoiding the back channel issues prevalent in the conventional art.

Figure 4:
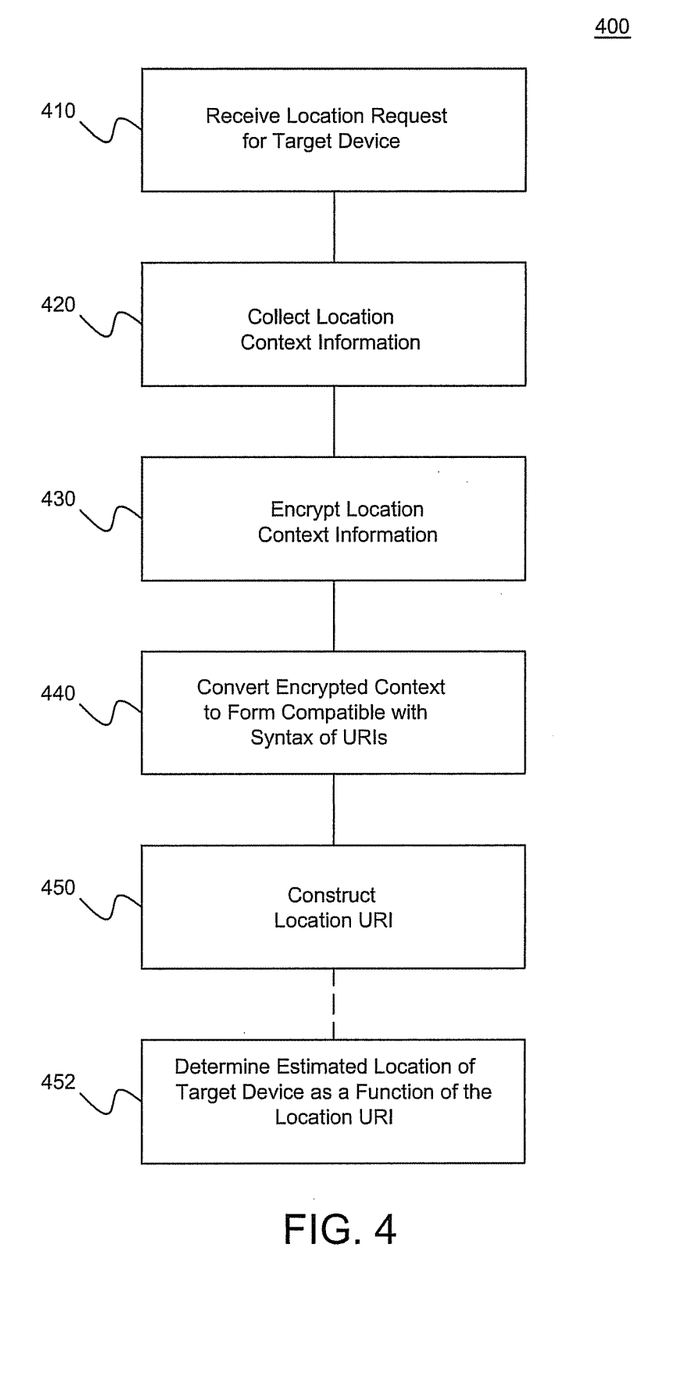
FIG. 4 is an algorithm according to an embodiment of the present subject matter.

FIG. 4 is an algorithm according to an embodiment of the present subject matter. With reference to FIG. 4, a method 400 for creating a location URI with embedded target device location context information is provided. At step 410, a location request may be received for a target device. An exemplary target device may be, but is not limited to, a cellular device, text messaging device, computer, portable computer, vehicle locating device, vehicle security device, communication device, or wireless transceiver. The location request may be in a geodetic location form, a civic location form or a location URI form. In one embodiment, the target device may request that its location be returned as a location URI from an exemplary location server, such as, but not limited to, an LIS. The LIS may, as discussed above, comprise one or more processing units at one or more processing sites. The location server may then collect the location context information, e.g., starting, validating and policy details, at step 420 and, in one embodiment, may include some of the steps required to provide a geodetic or civic location, e.g., determining the target device's MAC address or IP address. The starting details may include information for initiating a location determination for the target device, the validating details may include information correlating the starting details with the target device, and the policy details may include indicating whether a location of the target device may be provided to a requesting entity.

At step 430, the information in the location context may then be encrypted. This encryption may be conducted utilizing a method and encryption key known to any one or all processing units in the location server. At step 440, the encrypted context may then be converted to a form compatible with the syntax of URIs, e.g., hexadecimal string, etc. In certain embodiments, it may be necessary to compress the location context before the encryption process to keep a resulting location URI at a reasonable length. At step 450, the location URI may be constructed and may include the host address of the location server, other URI details (e.g., addressing information within the host based on protocol, routing and network details, etc.), and the encrypted context string. The location URI may also include a uniform resource name ("URN"), a uniform resource location ("URL"), and combinations thereof. For example, a non-limiting constructed URI may take the form of:

https://lis.example.com/somepath?c=encrypted-context-string

It should be noted that the lis.example.com above may represent a host name resolving to any one or combination of processing units in an exemplary location server. It may also be implemented utilizing a variety of mechanisms, including, but not limited to, directly using DNS, using a global server load balancing device, etc. In another embodiment, at step 452, an estimated location of the target device may be determined as a function of the constructed location URI, and the constructed location URI provided to a requesting entity. Of course, this requesting entity may be the target device or a third party such as a location client system. It should be noted that since the location URI also contains the location context information, no back channel between location server processing units is required. Any number of the steps described above and shown in FIG. 4 may be implemented in the location servers (e.g., LISs) depicted in FIGS. 1-3.

Figure 5:
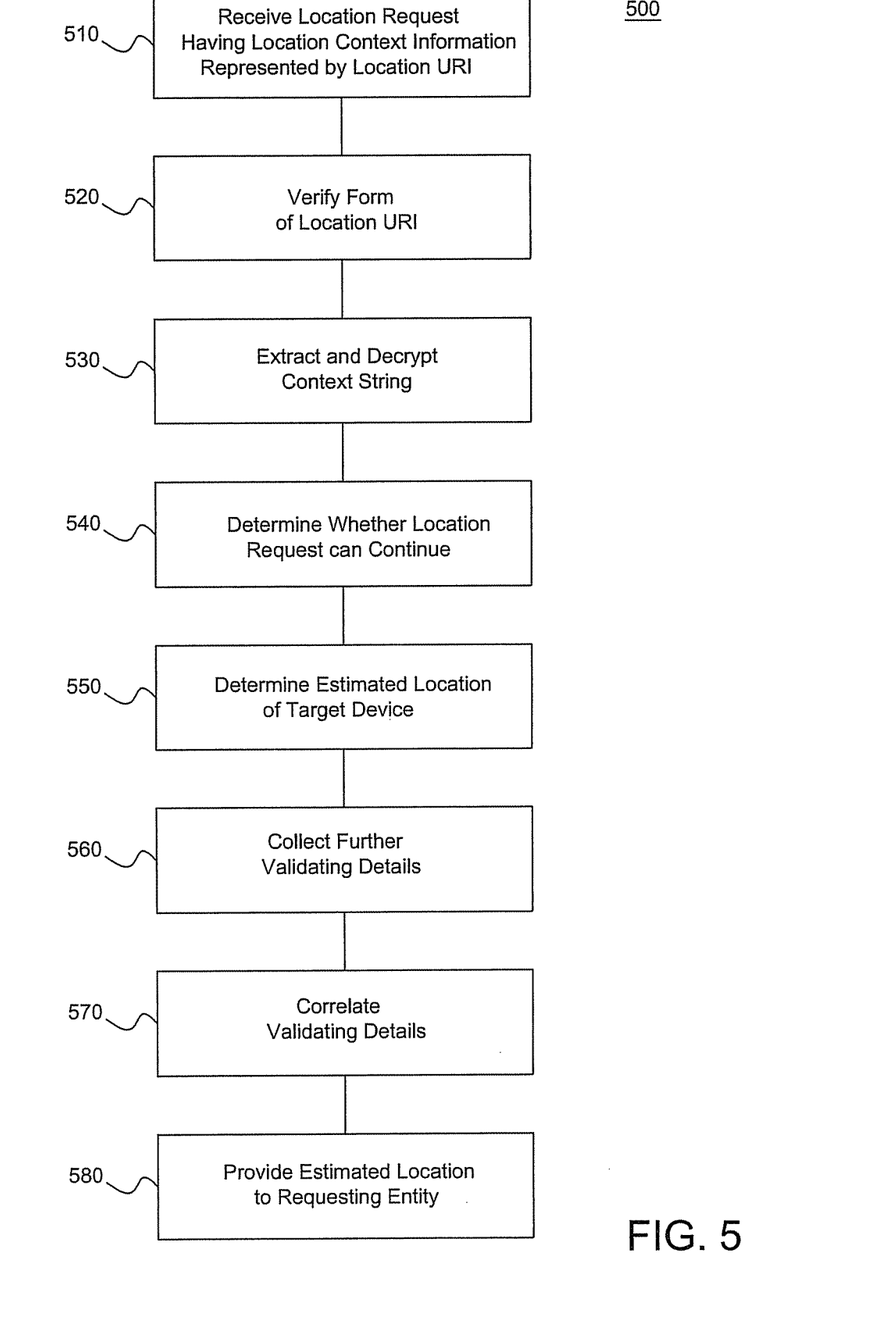
FIG. 5 is an algorithm according to another embodiment of the present subject matter.

FIG. 5 is an algorithm according to another embodiment of the present subject matter. With reference to FIG. 5, a method 500 for handling a location client request using a location URI containing embedded context is provided. At step 510, a location request may be received at a location server for a target device. In one embodiment, a location client may request the location server provide the civic or geodetic location of the target device having a context is represented by the location URI. This location URI may include starting details, validating details, and policy details and may also include a URN, URL, and combinations thereof. Exemplary starting details may be information for initiating a location determination for the target device, exemplary validating details may be information correlating the starting information with the target device, and exemplary policy details may be information indicating whether a location of the target device may be provided to the requesting entity. An exemplary target device may be, but is not limited to, a cellular device, text messaging device, computer, portable computer, vehicle locating device, vehicle security device, communication device, or wireless transceiver. The location request may be in a geodetic location form, a civic location form or a location URI form. In one embodiment, the target device may request that its location be returned as a location URI from an exemplary location server, such as, but not limited to, an LIS. The LIS may, as discussed above, comprise one or more processing units at one or more processing sites. At step 520, the form of the location URI may be verified by the location server, and this form may include an encrypted context string, a host address of the location server and/or addressing information based on protocol, routing, and network details.

At step 530, the location server may then extract and decrypt the encrypted context string. In one embodiment, the context string may be decrypted using shared knowledge among any number or combination of location server processing units that identify the necessary encryption algorithm and keys. At step 540, it may be determined whether the location request can continue as a function of the policy information. For example, if the expiry time in the reconstructed location context has passed, then an error may be returned to the location client and the process terminated. At step 550, given the reconstructed location context information, the location server may determine an estimated location of the target device as a function of the starting details. During this process, at step 560, additional validating details may also be collected. These additional validating details may be correlated or checked for consistency with the validating details in the target device's location context at step 570. In the instance where this check fails or is inconsistent, then an error may be returned to the location client instead of a location. In one embodiment, this consistency check may occur as information is collected, rather than after a location is determined; further, additional information beyond that needed to determine location may also be collected. At step 580, an estimated location of the target device may be returned or provided to the requesting entity. Of course, this requesting entity may be the target device or a location client system to enable the system to locate the device. Any number of the steps described above and shown in FIG. 5 may be implemented in the location servers (e.g., LISs) depicted in FIGS. 1-3.

It is thus an aspect of embodiments of the present subject matter to provide a system and method for creating and using location contexts embedded directly in a location URI suitable for use by a highly available location server for implicitly created location contexts.

As shown by the various configurations and embodiments illustrated in FIGS. 1-5, a system and method for managing created location contexts in a location server have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for creating a location uniform resource identifier ("URI") for determining the location of a target device, comprising the steps of:
    (a) receiving a location request for a target device;
    (b) collecting location context information for the target device including starting information, validating information and policy information;
    (c) encrypting the collected location context information in a location information server ("LIS");
    (d) converting the encrypted location context information to a form compatible with URI syntax; and
    (e) constructing a location URI with the converted location context information embedded within the location URI.

2. The method of claim 1 further comprising the step of determining an estimated location of the target device as a function of the constructed location URI.

3. The method of claim 1 further comprising the step of providing the constructed location URI to a requesting entity.

4. The method of claim 3 wherein the requesting entity is the target device or a location client.

5. The method of claim 1 wherein the step of collecting location context information includes determining the target device's Media Access Control address or Internet Protocol address.

6. The method of claim 1 wherein the location URI includes a host address of the LIS, an encrypted context string, and addressing information based on protocol, routing, and network details.

7. The method of claim 1 wherein the location URI includes a uniform resource name ("URN"), a uniform resource location ("URL"), and combinations thereof.

8. The method of claim 1 wherein the LIS comprises one or more processing units at one or more processing sites.

9. The method of claim 1 wherein the starting information includes information for initiating a location determination for the target device.

10. The method of claim 1 wherein the validating information includes information correlating the starting information with the target device.

11. The method of claim 1 wherein the policy information includes information indicating whether a location of the target device may be provided to a requesting entity.

12. The method of claim 1 wherein the location request is in a geodetic location form, a civic location form or a location URI form.

13. The method of claim 1 wherein the target device is selected from the group consisting of: cellular device, text messaging device, computer, portable computer, vehicle locating device, vehicle security device, communication device, and wireless transceiver.

14. A location information server ("LIS") comprising:
    (a) circuitry for receiving a location request for a target device;
    (b) circuitry for collecting location context information for the target device including starting information, validating information and policy information;
    (c) circuitry for encrypting the collected location context information;
    (d) circuitry for converting the encrypted location context information to a form compatible with uniform resource identifier ("URI") syntax; and
    (e) circuitry for constructing a location URI with the converted location context information embedded within the location URI.

15. The LIS of claim 14 further comprising circuitry for verifying the form of the location URI, the form including at least an encrypted context string.

16. The LIS of claim 15 wherein the form of the location URI further includes a host address of the LIS and addressing information based on protocol, routing, and network details.

17. The LIS of claim 15 further comprising circuitry for extracting and decrypting the encrypted context string.

18. The LIS of claim 14 further comprising circuitry for determining an estimated location of the target device and for providing the estimated location of the target device to a requesting entity.

19. The LIS of claim 18 wherein the requesting entity is the target device or a location client.

20. The LIS of claim 14 further comprising one or more processing units at one or more processing sites.

21. The LIS of claim 14 wherein the location URI includes a uniform resource name ("URN"), a uniform resource location ("URL") and combinations thereof.

22. The LIS of claim 14 wherein the target device is selected from the group consisting of: cellular device, text messaging device, computer, portable computer, vehicle locating device, vehicle security device, communication device, and wireless transceiver.

23. A method for creating a location uniform resource identifier ("URI") for determining the location of a target device, comprising the steps of:
    (a) receiving a location request for a target device;
    (b) collecting location context information in a location server for the target device including starting information, validating information and policy information;
    (c) converting the location context information to a form compatible with URI syntax; and
    (d) constructing a location URI by embedding the converted location context information within the location URI.

* * * * *